United States Patent
Goesnar et al.

(10) Patent No.: US 10,812,759 B2
(45) Date of Patent: Oct. 20, 2020

(54) MULTIMODAL SPATIAL REGISTRATION OF DEVICES FOR CONGRUENT MULTIMEDIA COMMUNICATIONS

(71) Applicant: Dolby Laboratories Licensing Corporation, San Francisco, CA (US)

(72) Inventors: Erwin Goesnar, Daly City, CA (US); Hannes Muesch, Oakland, CA (US); David Gunawan, Sydney (AU); Michael Eckert, Ashfield (AU); Glenn N. Dickins, Como (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/518,887

(22) Filed: Jul. 22, 2019

(65) Prior Publication Data

US 2019/0342521 A1    Nov. 7, 2019

Related U.S. Application Data

(62) Division of application No. 15/838,728, filed on Dec. 12, 2017, now Pat. No. 10,362,270.

(Continued)

(30) Foreign Application Priority Data

Jan. 24, 2017   (EP) .................................. 17152791

(51) Int. Cl.
*H04N 7/15*        (2006.01)
*H04M 3/56*        (2006.01)
(Continued)

(52) U.S. Cl.
CPC ................ *H04N 7/15* (2013.01); *G01S 3/80* (2013.01); *G01S 5/186* (2013.01);
(Continued)

(58) Field of Classification Search
CPC .......... H04N 7/15; H04N 7/142; H04N 7/147; G06K 9/00664; G06K 9/3275;
(Continued)

(56) References Cited

U.S. PATENT DOCUMENTS 8,587,631 B2   11/2013 Etter
8,879,761 B2   11/2014 Johnson
(Continued)

FOREIGN PATENT DOCUMENTS

| EP | 1551171 | 7/2005 |
|---|---|---|
| WO | 2004100546 | 11/2004 |
| WO | 2016081412 | 5/2016 |

OTHER PUBLICATIONS

Cedric, A.R. et al "A New Validated Method for Improving the Audiovisual Spatial Congruence in the Case of Stereoscopic-3D Video and Wave Field Synthesis" International Conference on 3D Imaging, Dec. 3-5, 2013,pp. 1-8.

(Continued)

*Primary Examiner* — Stella L. Woo

(57) ABSTRACT

Systems and methods are described for determining orientation of an external audio device in a video conference, which may be used to provide congruent multimodal representation for a video conference. A camera of a video conferencing system may be used to detect a potential location of an external audio device within a room in which the video conferencing system is providing a video conference. Within the detected potential location, a visual pattern associated with the external audio device may be identified. Using the identified visual pattern, the video conferencing system may estimate an orientation of the external audio device, the orientation being used by the video conferencing system to provide spatial audio video congruence to a far end audience.

20 Claims, 9 Drawing Sheets

Related U.S. Application Data

(60) Provisional application No. 62/433,188, filed on Dec. 12, 2016.

(51) Int. Cl.

| | | |
|---|---|---|
| *H04N 7/14* | (2006.01) | |
| *H04L 12/18* | (2006.01) | |
| *G01S 3/80* | (2006.01) | |
| *G06T 7/70* | (2017.01) | |
| *G01S 5/18* | (2006.01) | |
| *H04R 3/12* | (2006.01) | |
| *H04S 7/00* | (2006.01) | |
| *G06K 9/32* | (2006.01) | |
| *G06K 9/00* | (2006.01) | |

(52) U.S. Cl.
CPC ....... *G06K 9/00664* (2013.01); *G06K 9/3275* (2013.01); *G06T 7/70* (2017.01); *H04L 12/1827* (2013.01); *H04M 3/56* (2013.01); *H04N 7/142* (2013.01); *H04N 7/147* (2013.01); *G06K 2009/3225* (2013.01); *G06K 2209/03* (2013.01); *H04M 3/567* (2013.01); *H04R 3/12* (2013.01); *H04R 2499/11* (2013.01); *H04S 7/303* (2013.01); *H04S 2400/15* (2013.01)

(58) Field of Classification Search
CPC ........ G06K 2009/3225; G06K 2209/03; G01S 5/186; G01S 3/80; G06T 7/70; H04L 12/1827; H04M 3/56; H04M 3/567; H04S 7/303; H04S 2400/15; H04R 2499/11; H04R 3/12
See application file for complete search history.

(56) References Cited

U.S. PATENT DOCUMENTS

| | | | |
|---|---|---|---|
| 9,084,038 | B2 | 7/2015 | Siotis |
| 9,246,543 | B2 | 1/2016 | Zhou |
| 9,274,744 | B2 | 3/2016 | Hart |
| 9,368,117 | B2 | 6/2016 | Liu |
| 9,432,237 | B2 | 8/2016 | Bathurst |
| 9,621,795 | B1 | 4/2017 | Whyte |
| 2005/0008169 | A1* | 1/2005 | Muren ............... H04N 7/15 381/92 |
| 2005/0074054 | A1* | 4/2005 | Dobson ............. H04B 1/7093 375/143 |
| 2006/0104458 | A1 | 5/2006 | Kenoyer |
| 2007/0147634 | A1 | 6/2007 | Chu |
| 2013/0083948 | A1 | 4/2013 | Schmidt |
| 2014/0185852 | A1 | 7/2014 | Pereira |
| 2014/0211949 | A1 | 7/2014 | Neufeld |
| 2014/0348342 | A1 | 11/2014 | Laaksonen |
| 2015/0219755 | A1* | 8/2015 | Borggaard ........... G01S 11/14 367/118 |
| 2015/0319530 | A1 | 11/2015 | Virolainen |
| 2016/0005435 | A1 | 1/2016 | Campbell |
| 2017/0133036 | A1 | 5/2017 | Cohen |
| 2017/0201825 | A1 | 7/2017 | Whyte |
| 2017/0324931 | A1 | 11/2017 | Sun |
| 2017/0374317 | A1 | 12/2017 | Sun |

OTHER PUBLICATIONS

Chan, Y. et al "The Least Squares Estimation of Time Delay and its Use in Signal Detection" IEEE Transactions on Acoustics, Speech, and Signal Processing, vol. 26, Issue 3, Jun. 1978, pp. 217-222.

Chan, Y.T. et al "A Simple and Efficient Estimator for Hyperbolic Location" IEEE Transactions on Signal Processing, vol. 42, Issue 8, Aug. 1994, pp. 1905-1915.

Chen, X. et al "Multimodal Video Indexing and Retrieval Using Directed Information" IEEE Transactions on Multimedia, vol. 14, No. 1, Feb. 2012, pp. 1-14.

Foy, Wade H. "Position-Location Solutions by Taylor-Series Estimation" IEEE Transactions on Aerospace and Electronic Systems, AES 12, Issue 2, Mar. 1976, pp. 187-194.

Hashizume, H. et al "Fast and Accurate Positioning Technique Using Ultrasonic Phase Accordance Method" IEEE Region 10 TENCON, Nov. 21-24, 2005.

Knapp, C. et al "The Generalized Correlation Method for Estimation of Time Delay" IEEE Transactions on Acoustics, Speech, and Signal Processing, vol. 24, Issue 4, Aug. 1976, pp. 320-327.

Kunze, K. et al "Evaluating Spatial Congruency of 3D Audio and Video Objects" AES Convention, Apr. 26, 2012, pp.

Terada, J. et al "A Novel Location-Estimation Method Using Direction-of-Arrival Estimation" VTC-2005, IEEE 62nd Vehicular Technology Conference, Sep. 28, 2005, pp. 424-428.

\* cited by examiner

MULTIMODAL SPATIAL REGISTRATION OF DEVICES FOR CONGRUENT MULTIMEDIA COMMUNICATIONS

CROSS-REFERENCE TO RELATED APPLICATIONS

This application is a divisional of U.S. patent application Ser. No. 15/838,728, filed Dec. 12, 2017, which claims the benefit of priority to U.S. Provisional Patent Application No. 62/433,188, filed on Dec. 12, 2016, and European Patent Application No. 17152791.4, filed on Jan. 24, 2017, all of which are incorporated herein by reference in their entirety.

TECHNICAL FIELD

Embodiments herein relate generally to audio signal processing, and more specifically to determine orientation of an external audio device to provide congruent multimodal representation for a video conference.

SUMMARY OF THE INVENTION

Systems and methods are described for determining orientation of an external audio device in a video conference, which may be used to provide congruent multimodal representation for a video conference. A camera of a video conferencing system may be used to detect a potential location of an external audio device within a room in which the video conferencing system is providing a video conference. Within the detected potential location, a visual pattern associated with the external audio device may be identified. Using the identified visual pattern, the video conferencing system may estimate an orientation of the external audio device, where the orientation includes an angle of orientation in a horizontal plane. The orientation may be used by the video conferencing system to provide spatial audio video congruence to a far end audience.

Another embodiment of the present invention describes a video conferencing system. The video conferencing system may include a camera and an audio controller communicatively coupled to the camera. The camera may provide images of a room in which the video conferencing system is broadcasting and receiving video conference data from. The audio controller may include a processor configured to detect a potential location of an external audio device within a room based on the images of the room provided by the camera. The audio controller may also be configured to identify, within the detected potential location, a visual pattern associated with the external audio device. Using the identified visual pattern, the audio controller may be further configured to estimate an orientation of the external audio device, the orientation being used by the video conferencing system to provide spatial audio video congruence to a far end audience.

In the foregoing embodiments, the detecting the location of the external audio device may be done by applying a color filter to an image of the room, the color filter identifying a color of the external audio device, to generate a color-filtered image of the room. A shape filter may be applied to the color-filtered image of the room, the shape filter being applied only to areas in the color-filtered image that include the color of the external audio device, to identify a potential location of the external audio device. In further embodiments, the estimated orientation may be confirmed by the video conferencing system using a non-video form of detection (e.g., audible acoustic registration, wireless antenna diversity, and/or ultrasonic detection).

BRIEF DESCRIPTION OF THE FIGURES

This disclosure is illustrated by way of example and not limitation in the figures of the accompanying drawings, in which like references indicate similar elements, and in which.

DETAILED DESCRIPTION

Figure 1A:
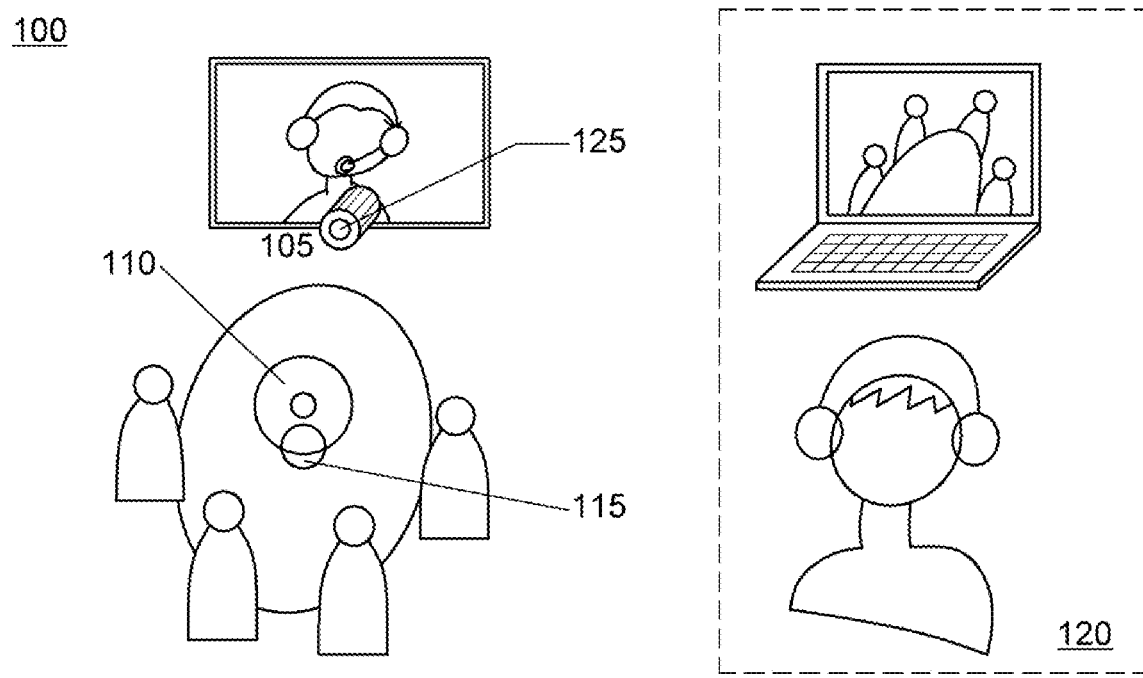
FIGS. 1A-B show schematic plan views of a video conferencing system in a conference room illustrating examples of equipment arrangements within the conference room.

For a general video conferencing system, it is desired to create and transmit to other endpoints of a conferencing call a single representation of the given captured room and participants or objects of interest therein. The multiple devices in the room do not necessarily have the same location, and in many cases it is desirable to have two devices substantially differently located in the room. Furthermore, each device may have a different set of modalities for input, including but not limited to video and/or audio. The process of creating or conveying to distant users or media storage a single congruent multimodal representation of that room presents a problem for system design and implementation. Various approaches for determining the relative position and orientation of a set of devices in a room in order to support this congruence requirement are described.

For example, consider the case were several spatial sensors are present in a particular room or area of interest. Each sensor may be aware of its relative spatial ability to sense activity and direction, perhaps in audio and/or video. When combing the captured content from the two devices in to a single congruent scene, it may be necessary to perform specific manipulations in the process of combining or rendering. There are two specific sub problems to this. First, there is the problem of determining the relative orientations of the sensors within the room. Second, there is the process of appropriate modification of the media. A set of creative embodiments and practical solutions to the first mentioned problem, specifically for the application of real time and recorded communications content, are described herein.

It is important to note that this problem is quite separate from the more commonly presented case of distributed spatial sensors working collectively to capture a spatial field. In particular, there is work on the unrelated thread of co-operative microphone capture: non rigid devices each having microphones that require accurate device location and orientation to form a synthetic or constructed microphone array for acoustic processing. The present invention considers the case where each device is capable of capturing a coherent and appropriate spatial scene relative to it's absolute point of view—for example a camera is able to detect an image from a particular range of solid angle with direction of light mapping onto the image plane; a spatial microphone is able to capture a sound encoding that includes direction of arrival to its center, etc. It is desirable to combine audio and/or video capture by multiple devices into a single stream of aligned and congruent audio and video, which may have a different registration problem of perceptually motivated congruence. This is different from specific sensor calibration and alignment for sensor fusion or array processing. The congruence described herein is that across the different modalities (i.e. video, audio, and other modalities described below), which are in certain problematic cases captured from different points of view.

Conventional systems may be able to locate and register separate devices by various means. However, such registration technology and ideas do not consider the specific challenges and approaches presented herein, where the desire to create a single congruent scene involves creating a certain composite or modified media that is reasonably and perceptually congruent, such that the different locations of the sensors is not evident, apparent or problematic to any viewer. Therefore, and specifically the present invention involves the location and registration of the devices in as much as that specific detail is required and useful for creating a congruent representation.

Figure 1B:
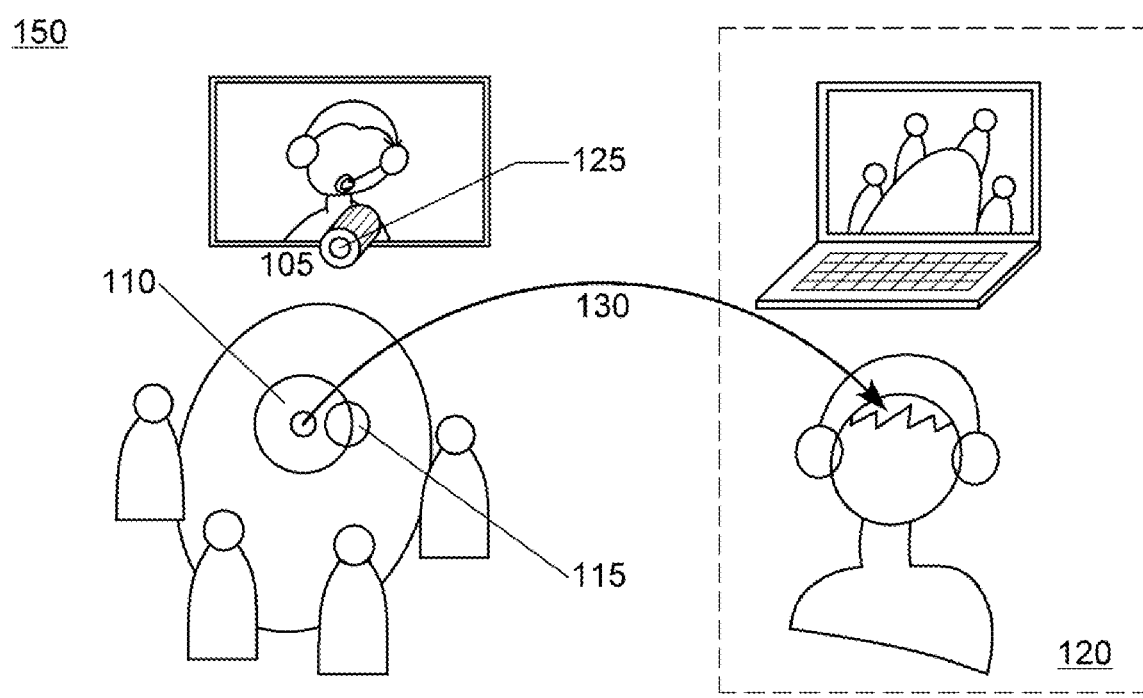

FIGS. 1A-B show schematic plan views of a video conferencing system in a conference room illustrating examples of equipment arrangements within the conference room. The exemplary conference rooms 100 and 150 each include a video conferencing system 105, and some additional premium or highly accessible audio conferencing system, displayed as external audio device 110 (which includes a microphone 115). As seen in FIGS. 1A-B, there is a situation of multiple connectivity tools in place simultaneously. Both a video conferencing system 105 and premium audio conferencing tool 110 are in use. The external device for capturing audio 110 is positioned on the table in a room with several participants. They are looking at a screen device 105 on the wall, which also houses a camera 125 for taking video input from the room. The video and audio points of view are clearly different.

At the far end 120, a user sees the video point of view of the table and also hears a spatial audio capture rendered from a spatial sound capture carried out by the table device 110. When the external device 110 and camera 125 are roughly oriented in the same direction (as shown in conference room 100), facing towards the conference participants, the congruence of the video and audio to the single person endpoint will be acceptable. If however, the external audio device 110 is rotated, as is shown in conference room 150, there is an immediate issue that the sound-field would not match the video in terms of relative orientation of the sound rendered to the end user, and the relative location of the participants seen on the video. This condition, also referred to herein as incongruence, may refer to situations where the audio device is positioned in the room such that a microphone of the external audio device has an angle of orientation in the horizontal plane that is greater than zero. In this case, where the device 110 is capturing an isotropic sound field representation 130, an acceptable solution would be to rotate the captured sound field by an appropriate approximate 90 degree amount at either the transmission or point of render. However, in order to make this simple transformation, the relative orientation of the audio capture device 110 to the video capture point of view must be determined.

By way of specific example, and in one embodiment, the sound-field captured by a set of microphones can be represented in a channel structure known as horizontal first order, where by three signals W, X and Y represent components for an omni-directional response and two dipole responses from a central point. This representation is convenient and also may be used to describe directional information for a horizontal sound scene. An ideal response of these signals to a source signal, S, arriving from a an angular direction θ would be:

$$W=S\ X=S^*\cos(\theta)\ Y=S^*\sin(\theta)$$

While it may not be possible to obtain this precise response characteristics from arbitrary real microphones, any system designed to capture a full horizontal soundfield with reasonably isotropy could be represented to first order in this form. Higher order soundfields may also be usable in other embodiments. From the form described above, the complete soundfield can then be rotated by an angle φ using a rotation matrix defined as $$R = \begin{bmatrix} 1 & 0 & 0 \\ 0 & \cos\varphi & \sin\varphi \\ 0 & -\sin\varphi & \cos\varphi \end{bmatrix}$$

$$R \cdot \begin{bmatrix} W \\ X \\ Y \end{bmatrix} = R \cdot \begin{bmatrix} S \\ S\cos\theta \\ S\sin\theta \end{bmatrix} = S \begin{bmatrix} 1 \\ \cos\theta\cos\varphi + \sin\theta\sin\varphi \\ -\cos\theta\sin\varphi + \sin\theta\cos\varphi \end{bmatrix} = S \begin{bmatrix} 1 \\ \cos(\theta - \varphi) \\ \sin(\theta - \varphi) \end{bmatrix}$$

The rotation expressed in the above matrix which may be applied to the signals is equivalent to rotating the arrival angles by an additional angle. In this way, the rotation transformation of a soundfield may be expressed as a linear operation.

In some cases the incongruence can be profoundly disconcerting. Consider the case of the audio capture device rotated through a complete 180 degrees with respect to the video capture device. The video and audio presented to the single end user with headphones may be immediately inverted as a result, with objects to the left in the video appearing to come from the right in the audio. It can be noted that for the case of a 180 degree rotation, a solution to congruence may also be to invert the video horizontally, though this may be more problematic in terms of creating other distortions of perceptual impact (e.g. mirroring faces and writing).

More complex variations may also be present during a video conference. For example, an audio device may be both rotated and translated from the central axis of the video point of view. Note this can happen where there is the case of a single camera and audio device alignment, and also in the case where the video being captured or displayed is drawn from a sub-region of the field of view or specifically zoomed and panned to better frame the image. As in the previous example, the baseline relative orientation of the two devices to each other may be needed to maintain audio-video congruence. In the case of an audio device located off the main axis of the current video framing, the relative orientation of the audio device, and a sense of the angle from the video device to the audio device may be needed. The situation may be even more complex in cases where there are relative orientations to be determined. In this case, both the angle of the audio device relative to the camera, and the orientation of the audio device relative to the camera axis or direction may be required.

Conventional solutions in the area of congruence often assume that the relative location of the devices is either well known or a fixed aspect of the design. In practice, when working with devices that have separate components, this is almost never the case. The key practical and pragmatic problem becomes working out the relative orientation at the start of a communication or capture with a fairly arbitrary starting point. In particular, the "huddle room" use case involves some device largely fixed (the wall or table edge screen) and another device or hub that is readily movable (the dialing pad or connection and control box on the working table). Hence, embodiments described herein are able to quickly and approximately determine the relative orientation with minimal assumptions.

In many cases, the congruence can be resolved or improved without the complete geometry being resolved. Therefore, it would be desirable to not necessarily resolve all of the geometry, since the robustness and effectiveness of the estimation may be more important than being completely accurate. In particular, often the relative angles are required, but not the distances. Alternatively, in some cases, the relative translation of one device in the field of view or angular registration of the other (such as where is a device in the video field) may be needed, instead of the distances.

The embodiments detailed below set out to obtain specific relative orientation information about the devices. If considered in a full geometric sense, it is noteworthy that some aspects of these embodiments are not sufficient to resolve a complete pose (e.g., azimuth, elevation, and yaw) of one device relative to the other. For example, when determining the orientation of the audio device using sound emitted from its own speakers, if the speakers all lay within one plane, only the orientation of that device relative to the other observance devices in one plane may be determined. When viewing the device from the camera, estimating the rotation of the device may have an amount of bias or error if the audio or marked device is not flat or at different distances. In this way, it is shown that this embodiment is not particular to any precise location, but rather a determination of approximate location and, more importantly, orientation. In some embodiments, it was found to be sufficient if the primary orientation in the horizontal plane of the device was known to within 15 degrees.

The embodiments presented here are also able to operate regularly or be repeated in the case that some movement or change is detected. It is noted that where a device is movable and placed on a conference table, it is quite likely that it be moved at some point. This is almost always the case when the device has some component of display or connectivity where orienting the device is required for users to operate from different seated positions.

In the remainder of the document, different embodiments are presented for working out the approximate registration of devices. It should be noted that in any actual system it is envisaged that there would be several of the embodiments used simultaneously to obtain a larger and more effective range of operation. In particular, several methods add to the robustness and ability to deal with situations where one method is impaired. For example there may be an object in the table that blocks the camera view of the audio device. Alternatively, there may be an object that confounds any ultrasonic method of range or direction detection. The idea of uncertainty and utilization of several methods is a major advantage of present invention. For example, in an embodiment there is an option for both a video registration where the camera may see the device, and an audio registration, where a sound emitted by the audio device is detected by the camera in a way that infers the orientation or horizontal rotation of the audio device to provide greater robustness in identifying the orientation of the external audio device. Both the audio and video methodology may determine the reliability of the estimate. For the video registration method, the reliability may be defined as the extent to which the object recognized as the audio device is visible, clearly in focus and of sufficient resolution to determine rotation. For the audio method, the reliability may be defined as the extent to which there were a set of clear first arrivals of audio signal at the camera for the available speakers, and that these arrivals represent a feasible geometric possibility. Given multiple N of estimates ($\theta\_1$ ... $\theta\_N$) with differing confidence ($C\_1$ ... $C\_N$), the combination of the estimates and confidence could occur as:

$$\hat{\theta} = \frac{\sum_{n=1}^{N} \frac{1}{1-C_n} \theta_n}{\sum_{n=1}^{N} \frac{1}{1-C_n}} \quad (1)$$

In this way, any number of estimates could be combined. Further, we note that this is a weighted mean with the weights being $1/(1-C\_n)$, and in this way we could also calculate the variance and standard deviation as:

$$\hat{\theta}^2 = \frac{\sum_{n=1}^{N} \frac{1}{1-C_n} \theta_n^2}{\sum_{n=1}^{N} \frac{1}{1-C_n}}, \quad (2)$$

$$\sigma = \sqrt{\hat{\theta}^2 - \hat{\theta}^2}, \quad (3)$$

$$C = \frac{1}{\sum_{n=1}^{N} \frac{1}{1-C_n}}. \quad (4)$$

At this point, the angular estimation may have an overall standard deviation, and provided that the overall confidence is sufficiently high, and the standard deviation of the fused measurements is sufficiently low (say for example 10 degrees or less), in an embodiment, then the estimation would be used to provide congruence. Even though it may be fairly imprecise, the combination of estimations or modalities, and noting the requirement is only for approximate angle may lead to a robust solution.

In the above embodiment, the derivation of the confidence expressions is shown. For the method of locating the device in the video frame and inferring the rotation, $$C\_video = Visible * Size * Match,$$

where Visible has a value of 0 or 1 based on if a match for the target is found, Size is a function that ranges from 0 to 1 such that the value is 0 when the size of the object in the video frame is equivalent to a distance of 10 m (for example), and 1 is for when the size is equivalent to a distance of 1 m. Match may be defined as a value obtained from the image classification or template correspondence, and may provide a measure of any occlusion or additional poor visibility of the full object.

For the audio registration case, there may be an inferred distance for each of the speakers emitting sound, and an unknown variable being the distance to the device. For the case of three of more speakers this may leave an over-specified problem, which allows for a solution and a quality of fit measure, based on how closely the three theoretical model distances match the three (or more) distances measured. A confidence measure based on this may be obtained, for example, using information about the speaker spacings, such that the confidence varies from 1 if the error is less than 0.01*speaker spacing, and is reduced to 0 if the error is equal or greater than 0.2 times the speaker spacing.

The conventional approach for detecting the orientation of the audio capture is using an acoustic or ultrasonic-based approach. The orientation may be determined by triangulating a known acoustic (including the audio from the remote participants) or ultrasonic signal generated from the speakers in the vicinity of the camera. However, this solution may require the acoustic transducer to be close to the camera, or attached to the camera in such a way as to reduce any geometric ambiguity. Hence additional hardware with acoustic transducer mounted on the camera might be needed. In addition, in a challenging acoustic environment (e.g., a highly reverberant room), the detection might not be reliable.

The proposed approach utilizes a camera, which is frequently a part of video conferencing systems, so no additional hardware is needed. Moreover, the performance of video-based orientation determination may be independent of the acoustic environment. In various embodiments, a video-based estimation of external device orientation may be used in conjunction with the acoustic based approach to address the shortcoming of the acoustic solution.

Figure 2:
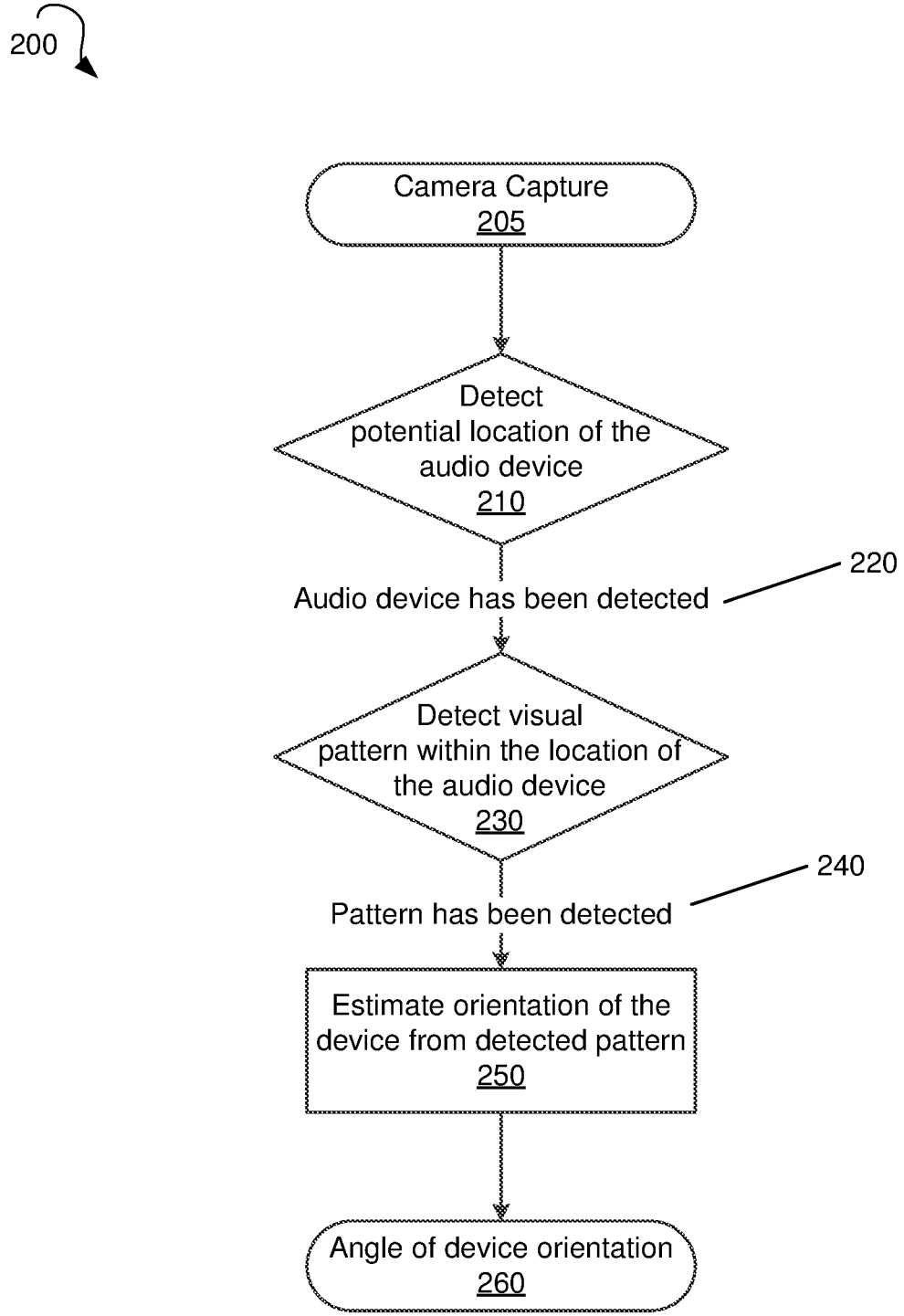
FIG. 2 shows a flow diagram for a method of determining orientation of an external audio device in a video conference, in an embodiment.

FIG. 2 shows a flow diagram for a method 200 of determining orientation of an external audio device in a video conference, in an embodiment. A camera of a video conferencing system may be used to capture, at step 205, and to detect a potential location of an external audio device within a room in which the video conferencing system is providing a video conference, at step 210. In order to reliably and efficiently detect the orientation of the phone, the external audio device may, in various embodiments, generate a simple and unique visual pattern for the camera to detect when in recording mode. This could be as simple as generating incomplete circle halo via light emitting diodes (LEDs) located on the external audio device. In addition, the shape of audio device is may be distinct enough to allow accurate detection of the device's potential location, along with the orientation. An example of this is a Dolby® conference phone (manufactured by Dolby Laboratories, Inc. of California, United States of America), which has an incomplete circle shape along with smaller circle disk embedded at front edge of the phone and can generate an incomplete blue ring of LEDs while in operation.

Figure 3:
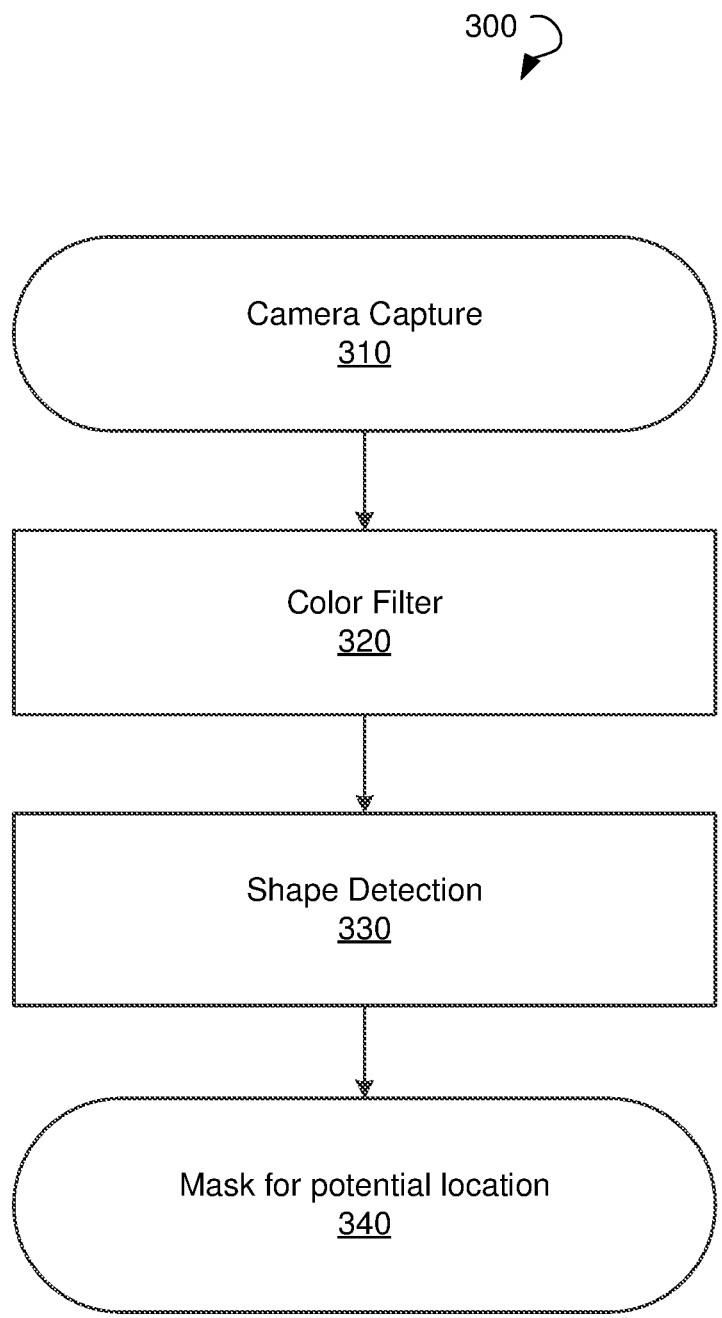
FIG. 3 shows a flow diagram for a method of detecting the location of an external audio device in a video conference, in an embodiment.

FIG. 3 shows a flow diagram for a method 300 of detecting the location of an external audio device in a video conference, in an embodiment. Method 300 may efficiently detect potential locations of the external audio device by applying the color filter, which may reduce the searching for the external device, and then applying the shape filter to further optimize searching. At step 310, the camera of the video conferencing system may capture images of the conference room from which the video conferencing system is broadcasting. The detecting the potential location of the external audio device may be done by applying a color filter to an image of the room, the color filter identifying a color of the external audio device, to generate a color-filtered image of the room at step 320. The applied color filter may keep only objects with a specified color (e.g., gray, black, white, etc.) of the external audio device in the image. The color filter may, in various embodiments, be a binary mask, where a pixel is assessed a value of one if the filtered color is present and zero if the filtered color is not present.

A shape filter may be applied to the color-filtered image of the room at step 330, the shape filter being applied only to areas in the color-filtered image that include the color of the external audio device, to identify a potential location of the external audio device. The shape filter may focus on shapes associated with the external audio device (e.g., an ellipse, a circle, a rectangle, etc.) in the color-filtered image for the potential location of the device. The shape filter in step 330 may be for the external audio device shape itself, which, from a side view, may be an ellipse in an exemplary embodiment. After the shape filter is applied, anything inside the detected shape may be preserved, including any visual pattern. The shape filter may be a binary filter, where the pixels of any shapes detected in the color-filtered image other than the shape associated with the external audio device are set to zero. At step 340, based on the identified potential location, a mask may be generated by the video conferencing system to be applied to images captured by the camera of the video conferencing system. The mask may, when applied to images, filter for the potential location of the external audio system. After application of the color binary filter and the binary shape filter, in various embodiments, the resultant binary mask may only contain objects with similar shape and color to the external audio device.

Figure 4:
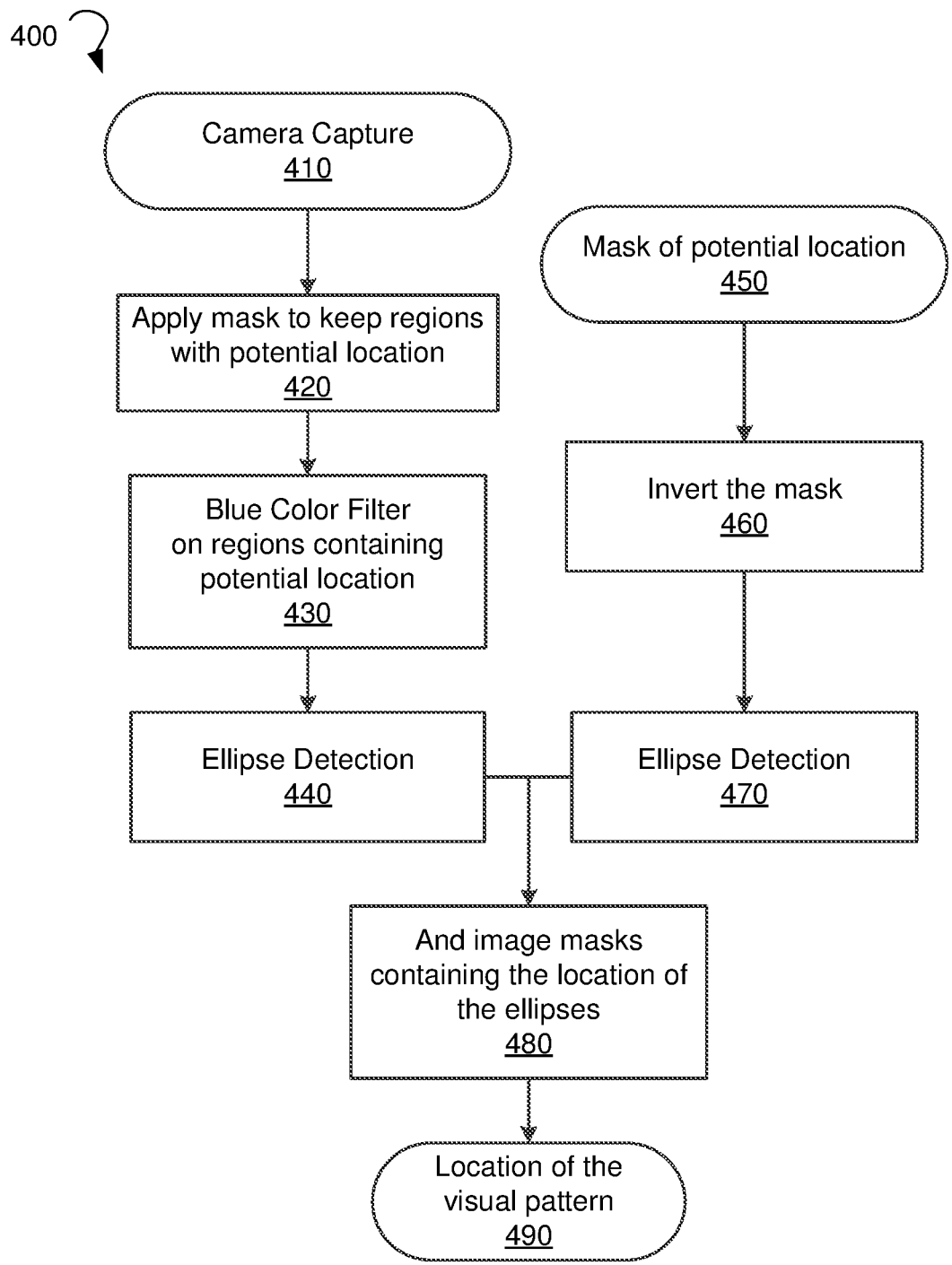
FIG. 4 shows a flow diagram for a method of identifying a visual pattern in a video conference room, in an embodiment.

Returning to FIG. 2, when the external audio device's potential location has been detected at 220, a visual pattern associated with the external audio device may be identified within the detected potential location at step 230. FIG. 4 shows a flow diagram for a method 400 of identifying a visual pattern in a video conference room, in an embodiment. At step 410, the camera of the video conferencing system may capture images. The images may be red-green-blue (RGB) color-coded images in an embodiment. The mask for the potential location of the external audio device, such as the mask generated at step 340 of method 300, may be applied to create a potential region within the room that includes the external audio device.

A color filter may be applied at step 430 to the potential region within the room (e.g., identified in step 420) to identify a color associated with the visual pattern. For example, the color filter may identify a color of an incomplete circle of light-emitting diodes (LEDs) that is associated with the external audio device (e.g., blue, red, etc.), the identified color being different from a color of the external audio device (e.g., gray, black, etc.). At step 440, a shape filter, such as the shape filter applied at step 330 of method 300, may be applied to the regions with the potential location of the external audio device to filter for a shape of the visual pattern. While the shape being filtered in method 400 is an ellipse (e.g., an ellipse of LEDs), any suitable shape of the visual pattern may be the subject of the filtering at step 440. Even when the visual pattern is a partial circle of LEDs, from any view other than a top view, the visual pattern will resemble an ellipse, and therefore a broader ellipse filter may be used, rather than merely a filter for a circle. Moreover, a circle may, in some embodiments, be a special case of an ellipse, and therefore the ellipse shape filter applied at step 440 may identify circles as well.

Meanwhile, at step 450 a mask of the potential location of the external audio device, such as the mask generated at step 340 of method 300, may be applied to the image data. At step 460, the mask for the potential location of the external audio device may be inverted. Since the visual pattern has a color different from the color of the external audio device, inverting the mask of the potential location may cause the visual pattern to be detectable within the potential location region. For example, when the mask of the potential location is a binary mask, the output of the color filter applied at 320 will set the mask to zero where the visual pattern is located, while the area around the visual pattern is set to one (since the color matches the audio device). Inverting this mask, which includes the color filter applied at step 320, would set the location of the visual pattern to one in the potential location region while the surrounding of the visual pattern would be set to zero. Accordingly, applying the inverted mask of the potential location may provide the location of the visual pattern, since values of one in a masked image indicate the location of the visual pattern on the external audio device.

A shape filter, such as the shape filter applied at step 330 of method 300, may be applied to images where the inverted mask has been applied at step 470 to identify potential locations of the visual pattern, paralleling the steps 430-440 for images where an inverted mask has been applied. While the shape being filtered in method 400 is an ellipse, any suitable shape of the visual pattern may be the subject of the filtering at step 470. That is, the shape filter at 440 is to detect, for example, a blue LED ring, where the visual pattern is the blue LED ring on the external audio device. When the device has a gray color, for example, the shape filter at 470 would be to detect a non-gray color ring. Similar to the ellipse shape filter applied at step 440, the ellipse shape filter at 470 may also identify a circle (i.e., a ring of LEDs viewed from the top, rather from the side), due to a circle being a special case of ellipse. At step 480, the image masks containing the locations of the ellipses identified in steps 440 and 470 are merged using an "and" function, thereby generating a mask for the detected visual pattern. Using the "and" function, the presence of the visual pattern on the external audio device may be identified, by ensuring that the color and shape of the visual pattern are found (from the mask output by step 440) in an area of the conference room that has the color of the external audio device, by constraining the surrounding of the visual pattern to be the color of the external audio device (from the mask output by step 460). The visual pattern may be identified at step 490 when the merged image mask from step 480 is applied to the images from the camera.

Figure 6:
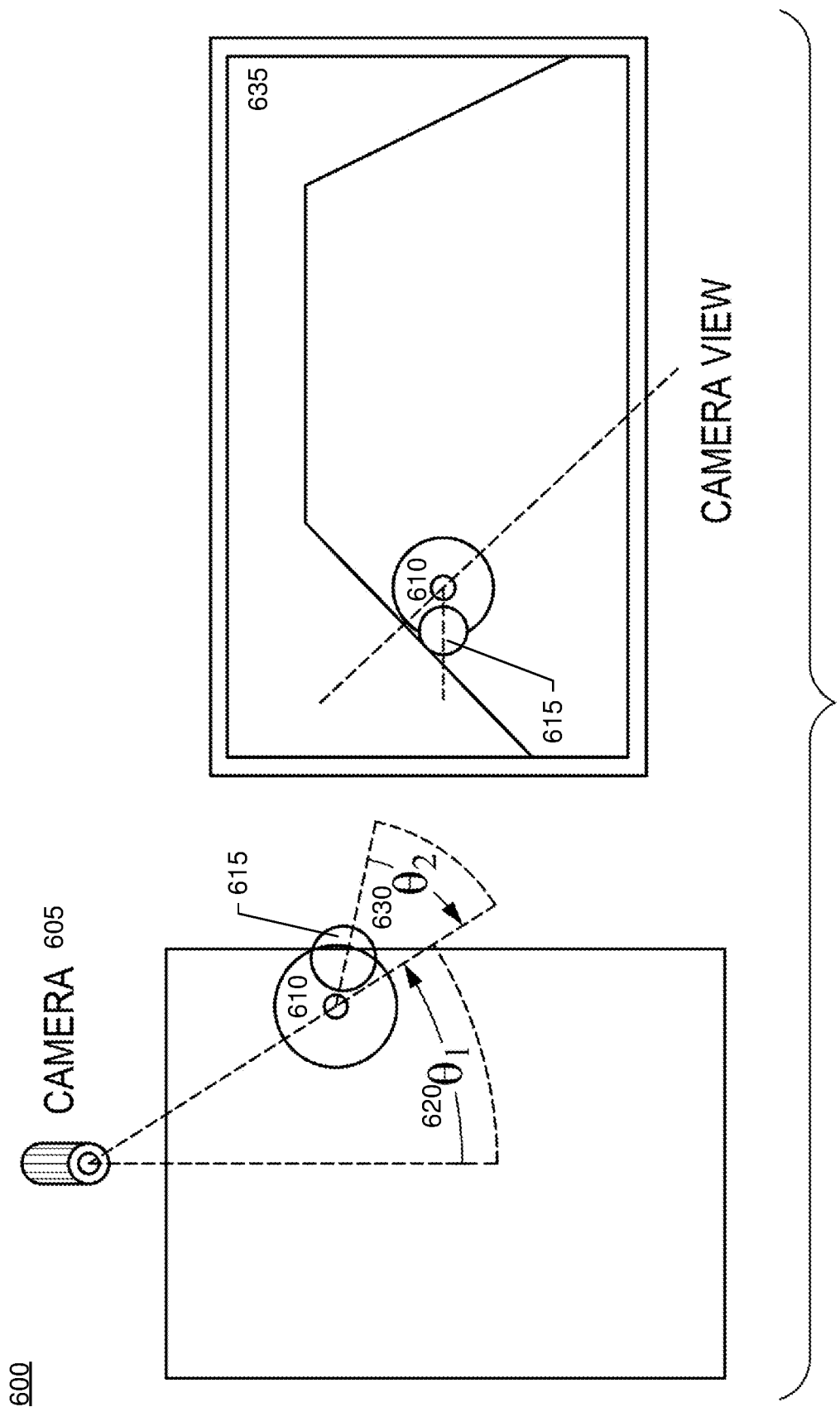
FIG. 6 shows a schematic plan view of a video conferencing system in a conference room illustrating parameters determined as a result of estimating the orientation of an external audio device, in an exemplary embodiment.

Returning to FIG. 2, when the visual pattern has been detected at 240, the video conferencing system may, using the identified visual pattern, estimate an orientation of the external audio device at step 250. The orientation may include an angle of orientation in a horizontal plane, as is shown in FIG. 6, for example. The estimated orientation may be used by the video conferencing system to provide spatial audio video congruence to a far end audience. Likewise, the visual pattern may be used at step 260 to estimate the angles of device orientation, where the values may be used to calculate a transform to provide the spatial audio video congruence.

Figure 5:
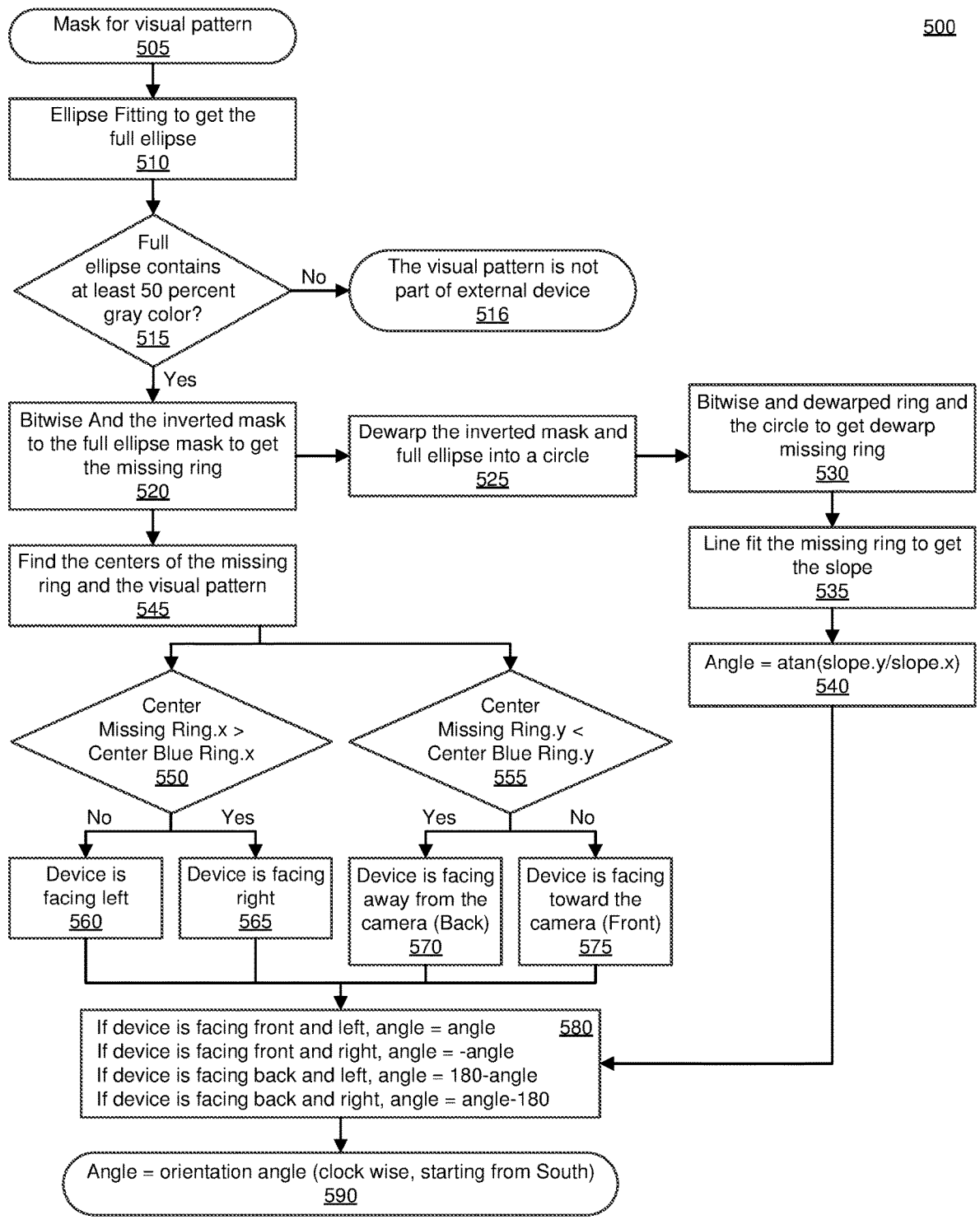
FIG. 5 shows a flow diagram for a method of estimating the orientation of an external audio device, in an embodiment.

FIG. 5 shows a flow diagram for a method 500 of estimating the orientation of an external audio device, in an embodiment. A mask for the detected visual pattern, such as the mask generated by step 480 of method 400, may be applied at step 505. In an embodiment where the visual pattern has a partial circular shape, which would appear to be an ellipse from a side view, the mask may be modified by applying ellipse fitting to the contour of the partial elliptical shape to obtain a model of a full ellipse for the visual pattern at step 510. Any conventional ellipse fitting algorithm may be applied, including, but not limited to, a least square approach. The ellipse fitting results in a full ellipse that includes the partial ellipse of the visual pattern and a filled-in portion, also known as a "missing ring." At step 515 the full ellipse is checked to verify that the full ellipse is located on the external audio device. When a threshold amount of color of the external audio device (e.g., 50% of the area within the full ellipse contains a gray color, when gray is the color associated with the external audio device) is not present, the video conferencing system determines that the visual pattern is not part of the external device at step 516. When the color filter verifies that a threshold amount of color of the external audio device is present within the full ellipse, a "bitwise and" function may be used to join the full ellipse mask generated at step 510 and a mask that is an inversion of the mask for the visual pattern applied at block 505 to generate a mask for a "missing ring" at step 520. In embodiments where the visual pattern is has a partial elliptical shape, the missing ring may correspond to the portion of the full ellipse described above not present in the visual pattern. For example, if the visual pattern includes LEDs shaped in two-thirds of a perimeter of an ellipse, the missing ring would include the remaining one-third perimeter of an imaginary full ellipse that includes the visual pattern.

Then, at step 545, a center of the visual pattern (e.g., an incomplete circle of LEDs) and a center of the missing ring may be identified, the centers each having their own x- and y-coordinates. The center coordinates may be computed by, for example, first calculating the top left and bottom right coordinates of the region of the conference room that include the missing ring in the mask. For example, the top left coordinate of the masked image may be set as the top-most and left-most active pixel. In embodiments where the mask is a binary mask, this may correspond to the top-most and left-most pixel with a value of one. Likewise, the bottom right coordinate may be set to the coordinate of the bottom-most and right-most active pixel of the masked image (e.g., the bottom-most and right-most pixel with a value of one, in a binary-masked image). After the top left and bottom right coordinates have been calculated, a midpoint between the top left and bottom right coordinates may be calculated that corresponds to the center coordinate of the missing ring. The process may be repeated for the visual pattern to determine the center of the visual pattern.

The x- and y-coordinates of the center of the incomplete circle and the center of the missing ring may then be compared. Based on the compared x- and y-coordinates, the orientation of the external audio device may be estimated. In the exemplary method 500, when the center of the missing ring has a greater x-value than the center of the incomplete circle (e.g., a blue ring of LEDs), at step 550, the device may be facing right at block 565. When the center of the missing ring has a smaller x-value than the center of the incomplete circle, the device may be facing left at block 560. Similarly, when the center of the missing ring has a smaller y-value than the center of the incomplete circle (e.g., a blue ring of LEDs), at step 555, the device may be facing away from the camera at block 570. When the center of the missing ring has a greater y-value than the center of the incomplete circle, the device may be facing toward the camera at block 575.

While the coarse device orientation may be determined using the locations of the centers of the visual pattern and the missing ring, an exact angle that the external audio device has with respect to the camera may also be determined and utilized to provide better congruence. The inverted mask for the visual pattern from step 505 may dewarped and converted into a circle at block 525. Also, at block 525, the full ellipse may also be dewarped and converted into a circle. The dewarping may correct perspective distortion, since, for example, the visual pattern may be perceived from a side angle view as an ellipse, when in fact the visual pattern may be a circle or partial circle when viewed from a top-down angle as described above. The dewarping may be performed using a dewarping map for converting ellipses to circles. In an embodiment, the same dewarping map may be used for the inverted mask for the visual pattern (which, when applied to an image from the camera, returns a negative image of the visual pattern) and the full ellipse. A bitwise "and" function may be applied to the dewarped mask for the visual pattern (e.g., a partial circle) and the circle obtained by dewarping the full ellipse to get a dewarped missing ring at step 530. A line fit may be applied to the missing ring, which may include passing a line through a plane formed by the dewarped missing ring, to get a slope of the dewarped missing ring at step 535. Based on the slope, an angle of the external audio device may be calculated at step 540. In the exemplary embodiment shown in method 500, the angle may be computed as being equal to the arctangent of the slope of the line passing through the plane formed by the dewarped missing ring, atan (slope·y/slope·x). Other suitable formulas may be used to determine the angle of the external audio device, however. Based on the determined orientation of the external audio device, the angle may be determined using the logic described in step 580, and a transform may be determined at step 590.

FIG. 6 shows a schematic plan view of a video conferencing system 600 in a conference room illustrating parameters determined as a result of estimating the orientation of an external audio device, in an exemplary embodiment. Method 200 may be applied by the video conferencing system to determine angles θ1 620 and θ2 630, as the output of step 540 is equal to −(θ1+θ2) (the angle output from step 540 is negative due to it being calculated in a clockwise direction, whereas θ1 620 and θ2 630 are displayed as being counterclockwise). θ1+θ2 may be derived from the output of step 540, as is described above and in FIG. 5. Here the audio device 610 is both rotated and translated from the central axis of the camera 605 point of view 635 (e.g., see position of microphone 615 of the audio device 610). Note this can happen where there is the case of a single camera and audio device alignment, and also in the case where the video being captured or displayed is drawn from a sub-region of the field of view or specifically zoomed and panned to better frame the image. In the case of an audio device located off the main axis of the current video framing, we note that the requirement is for the relative orientation of the audio device θ2 630, and a sense of the angle from the video device to the audio device θ1 620. These angles may be output when the orientation of the audio device is determined (e.g., by application of method 5).

While registration of the orientation of an external device using video detection is described above, other modes may be used to determine the orientation, either singly or in combination with the video detection. In some embodiments, such as those described above using a confidence estimate to combine video and audio orientation registration methods, non-video methods may be applied by the video conferencing system to confirm the estimated orientation of the external audio device.

The general problem of data fusion and combination of estimations over time and alternate estimators may utilize suitable methods, including Kalman filters and Bayesian inference, for combining multiple observations under conditions of uncertainty.

Acoustic detection may be another mode by which the external device's orientation may be determined. For example, in a camera speaker emitting embodiment, a speaker at the camera emits a signal (either audible or inaudible range). Multiple microphones at the device may receive the signal and process using a mixture of amplitude and phase information to determine the direction of arrival of the emitted signal. The processing could be based on magnitude for low frequencies, could be based on phase for high frequencies, for example. In a device-emitting embodiment, a microphone at the camera receives a signal emitted from a multi-speaker device. The microphone can analyse the signals emitted by the device and determine the orientation of the device using the time delays from the captured signals. In an embodiment, multiple sweeps or signals could be used that enable an impulse response or other signal to determine time delays.

Figure 7:
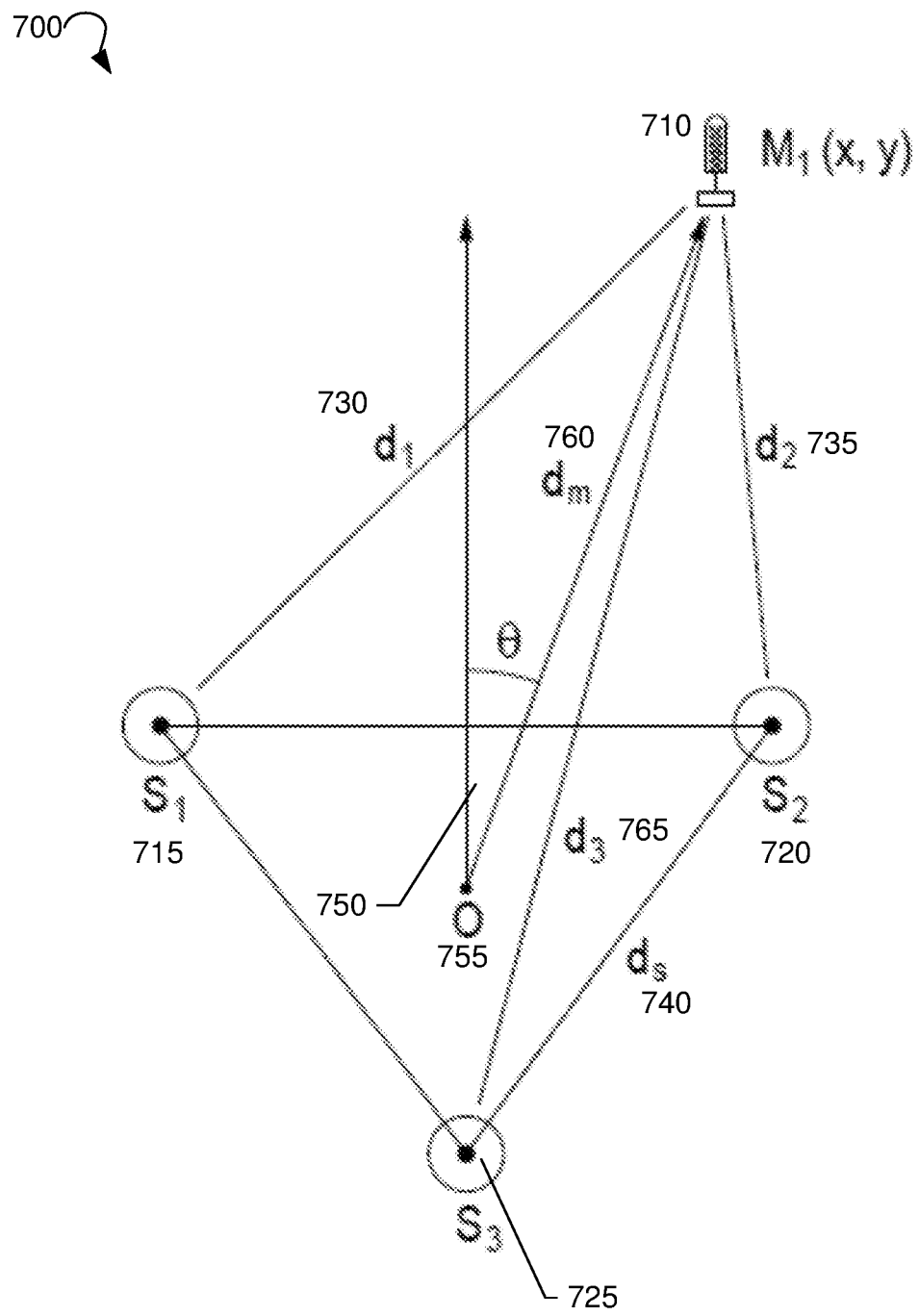
FIG. 7 is a block diagram of an exemplary system for using audio signals to estimate the orientation of an external audio device, in an embodiment.

FIG. 7 is a block diagram of an exemplary system 700 for using audio signals to estimate the orientation of an external audio device, in an embodiment. While the discussion below focuses on a sequence of band-limited audio signals, such as chirped audio signals, where the audio signals are all acoustic signals, the system 700 is not limited in this regard, and may instead use a sequence of ultrasonic audio signals only, or a mixture of audio signals and ultrasonic signals. The audio signals may be chirped, as discussed below, or any other suitable audio signal that a transient (impulsive in nature) may be derived from. In an embodiment, the audio signals may be limited to signals having a bandwidth of at least 2 kHz. Shown in system 700 are a video conferencing system that includes three speakers $S_1$ 715, $S_2$ 720, and $S_3$ 725 and has a center point O 755. System 700 also includes an external audio device having a microphone $M_1$ 710, the microphone $M_1$ 710 having coordinates (x,y) with respect to center point O 755 of the video conferencing system.

Given a number of microphones on the external audio device and another set of speakers on the video conferencing system in a known geometry, the orientation of the external audio device may be determined using acoustic or ultrasonic signals from the speaker to the microphone/s. In one embodiment, a device with 3 speakers oriented in a triangular shape may send acoustic or ultrasonic chirps to a microphone in a particular location. These chirps, when offset in time, may be picked up at the microphone and their time delay can be used to determine the distance between the microphone and each of the speakers.

In system 700, the goal may be to determine the orientation angle θ 750 of the external audio device with respect to the video conferencing system. In an embodiment, the plurality of speakers $S_1$ 715, $S_2$ 720, and $S_3$ 725 of the video conferencing system may transmit a sequence of chirped audio signals, each of the sequence being transmitted a predetermined time duration apart, where every one of the plurality of speakers $S_1$ 715, $S_2$ 720, and $S_3$ 725 transmits at least one of the chirped audio signals in the sequence. For example, a sequence of chirps may be as simple as each speaker $S_1$ 715, $S_2$ 720, and $S_3$ 725 transmitting a single chirp each, one at a time. For robustness, the speakers may transmit several chirps, each one at a time, before proceeding to the next speaker. Any suitable order may be used for the chirps from each speaker.

The external audio device may then determine the impulse response of each of the sequence of chirped audio signals, the impulse responses being based on recordings of the transmitted sequence provided by the external audio device. To determine the impulse response, the external audio device may rely on the distance between speakers $d_s$ 740 being known; in an embodiment, such as system 700, the three speakers are equidistant from each other. In other embodiments, however, the distance between speakers $d_s$ 740 does not need to be known, since only relative distance is necessary to determine orientation of the external audio device. Based on the geometry of system 700, the following calculations may be made to solve for the orientation angle $\theta$ 750:

$$x = d_m * \sin\theta \quad (5)$$

$$y = d_m * \cos\theta \quad (6)$$

$$d_1 = \sqrt{(x+d_s/2)^2 + (y-d_{sy})^2} \quad (7)$$

$$d_2 = \sqrt{(x+d_s/2)^2 + (y-d_{sy})^2} \quad (8)$$

$$d_3 = \sqrt{(x^2 + (y+d_{cs})^2}. \quad (9)$$

In the foregoing, $d_m$ 760 may be defined as the distance between the center of the video conferencing system O 755 and the microphone $m_1$ 710 of the external audio device. The expressions $d_{cs}$ and $d_{sy}$ may be defined as:

$$d_{cs} = d_s/2/\cos(\pi/6) \quad (10)$$

and $$d_{sy} = d_s/2 * \cos(\pi/3). \quad (11)$$

The distances $d_1$ 730, $d_2$ 735, and $d_3$ 765 can be determined by recording the chirps presented one at a time (a predetermined time duration apart), and convolving the recorded chirps with their inverse to get impulse responses. For example, the recorded chirp signal r(t) at the microphone may be convolved with an inverse chirp signal c_inv(t) to produce an impulse response. If a point around where the chirp playback started is selected (need not be sample accurate since relative distances are being calculated), then the time between the start of playback t_0 and the time of the first peak t_p1 may be measured. The distance between the microphone and the speaker that sent the chirped audio signal may then be calculated using:

$$d\_est = v\_s * (t\_p1 - t\_0)/fs. \quad (12)$$

Where v_s is the speed of sound and fs is the sampling freq.

From the determined impulse responses of the sequence of chirped audio signals, arrival times for the chirped audio signals at the external audio device may be estimated. To estimate the arrival time, the energy envelope can be detected in response to the first arrival of each audio signal. The energy envelope may be calculated, for example, by using rectification and filtering, or by calculating a Hilbert response and magnitude of the energy envelope. For example, the first peaks of a smoothed impulse response may be selected to estimate the time of arrival. Any suitable smoothing algorithm may be applied, including a Hilbert transform, or a low-pass filter, for example.

A distance from each of the plurality of speakers to the external audio device may then be calculated based on the estimated arrival times for the chirped audio signals. The distance may also be estimated using the first peaks of a smoothed impulse response.

An orientation angle may then be calculated between the video conferencing system and the external audio device based on the calculated distances from each of the plurality of speakers to the external audio device. In the embodiment of system 700, for example, estimation of $\theta$ 750 can be performed by solving the above equations 5-9, or by minimising the error between the estimated distances (using equations 5-9) and actual measured distances. In the described embodiment, the angle calculation is done by a processor of the external audio device in communication with the microphone. The calculated angular information may then be sent to the video conferencing system and/or onto the renderers at the far end via a network connection.

In another embodiment, the times of arrival of each of the sequence of audio signals may be estimated by convolving recordings of the transmitted sequence of audio signals with a determined filter for each transmitted audio signal, wherein the matched filter incorporates a calculated band-limited inverse of the transmitted audio signal. The matched filter may not need to be a full impulse response when, as described above, the audio signals are band limited to, for example, 2 kHz.

While embodiments above describe using band-limited audio signals, such as chirped signals, the orientation may be determined acoustically using a spread spectrum response in other embodiments. A stimulus with bandwidth substantially greater than 2 kHz may be provided by the video conferencing system with level-matching background noise levels in the environment for a long enough period of time to calculate a suitably accurate signal-to-noise ratio ("SNR"). The SNR may be used to determine the orientation of the external audio device.

As described above, in an embodiment, a partial frequency bandwidth may be used that is above the main audible frequencies. In another embodiment, longer structured stimulus may be used known as a spread spectrum, whereby a long broad band coded sequence is used at a lower signal level. By setting the output level of the spread spectrum signal to be near or below the ambient noise in the room, this may also create a stimulus that is not audible or problematic. Spread spectrum techniques and codes may include pseudorandom sequences, gold codes, and/or maximal length sequences. In a further embodiment, appropriate shaping of the spread spectrum output can be made to match the noise profile of the room, gaining maximum signal to noise ratio for the transmitted code whilst minimizing the audibility in any frequency band. Such spreading codes would normally be transmitted for longer periods of time, for example 1-2 seconds, and by using different or orthogonal codes, all speakers would be able to simultaneously output audio if it were required to get a faster orientation determination.

Finally, it is worth a note that the 'structured stimulus' could include appropriately massaged or sufficiently persistent audible signal related to the user interface. The emitted stimulus could include appropriately designed content that is both suitably complex for determining a channel response and also part of a user interface component of the device. Some examples include items such as hand claps, drums and other percussive sounds, wideband voice and wide-frequency-ranging music content.

Using a different modality, it is envisaged that many of the devices being considered will be wirelessly connected, or alternatively have at least one wireless system for pairing and local device presence and data exchange. This presents an opportunity to use this for obtaining an approximate sense of relative orientation. For example, a MIMO Antenna may be used for approximate DOA. Devices using MIMO diversity have multiple antennae usually arranged in a known geometry. When two wireless devices are within line of sight, the dominant wireless path is direct and an approximate direction can be obtained.

Figure 8:
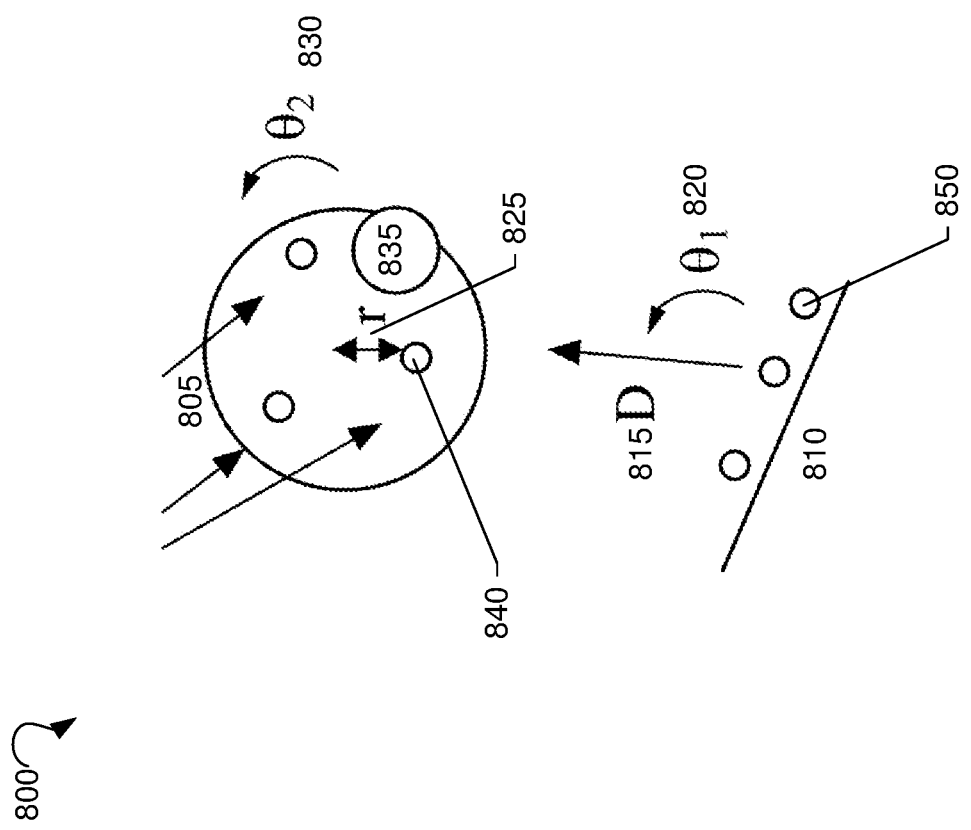
FIG. 8 is a block diagram of an exemplary system for using ultrasonic transducer detection to estimate the orientation of an external audio device, in an embodiment.

Such an approximate direction of arrival is useful for the registration problem at hand, and the SSID beacon or regular traffic on the wireless transceivers could be used to determine an approximate DOA. In many cases the relative antenna phase or intensity signals is available from a high level query of the wireless communications device permitting this approach in many installations. FIG. 8 is a block diagram of an exemplary system 800 for using ultrasonic transducer detection to estimate the orientation of an external audio device, in an embodiment.

Given a sufficient number of devices and the ability to accurately measure round trip wireless signal propagation delay, a network of distances can be obtained and solved in order to get a sense or relative displacements of devices. With multiple antennae on each device, this can also extend to orientation. This presents a more complex approach than the first listed embodiment.

It is envisaged that the devices in the room will have ultrasonic detectors and emitters physically located on the devices. The existence of these ultrasonic detectors or emitters on the devices (850 for the video conferencing system, 840 for the external audio device), illustrated in FIG. 8, presents an opportunity to use the ultrasonic transceivers for obtaining detailed geometry of the two devices with respect to each other. There are large number of specific configuration of ultrasonic detectors and emitters that, when placed on the devices, will allow calculation of the geometry of the devices to varying levels of accuracy and robustness.

The embodiment has the following form: One or more ultrasonic transmitters 850 on one device 810, and one or more ultrasonic receivers 840 on the second device 805. A preferred formulation of a single transmitter on the camera and multiple receivers on the audio endpoint as illustrated in FIG. 8. This formulation allows estimation of distance, D, and congruence angle, $\theta 2$, with good robustness. D can be estimated trivially by aligning send time from the transmitter with receive time from the receiver (see, e.g., reference 1) $\theta 2$ can be estimated using a variety of techniques, including Time of Arrival (ToA), Time Difference of Arrival (TDOA), Angle of arrival (AoA), and energy levels at the receivers. A preferred formulation using multiple transmitters at the camera receiver and multiple receivers at the audio endpoint will additionally allow the estimation of $\theta 1$. The formulation can be inverted and the transmitters can be placed at the audio endpoint and the receivers at the camera to achieve the same geometry estimates.

The distance, D 815, of the camera from the audio endpoint is trivially estimated by time aligning the send time of a transmitted signal and the receive time of the received signal and calculating D by the simple formula of D=$\lambda \Delta T$, where $\lambda$ is the speed of sound in the conference room and $\Delta T$ is the estimated time difference between transmit time and receive time. The speed of sound is 343.2 m/sec at 20 degrees C. The speed of sound is temperature dependent, but since conference rooms are generally within 10 degrees of the standard temperature, the variation in estimated distance is expected to primarily be associated with the error of the estimate rather than temperature variations in a room. This estimate requires only one transmitter and one receiver, and since any individual receiver may be shadowed or obscured, it is preferred that this calculation be done on multiple receivers and/or transmitters and use the most robust estimate. Reference 1 provides classic implementations of time delay estimates from a noisy sensor.

The congruence angle, $\theta 2$ 830, is a useful parameter defining AV congruence for a soundfield capture device. The estimation of $\theta 2$ can be reliably estimated with at least three receivers on the audio endpoint device and one transmitter on the camera, though improved robustness and accuracy can be obtained using more receivers. A simple method of estimating the congruence angle is to ensure that each of the receivers have preferred direction of detection (achieved by shadowing on the device or by physical construction at the receiver) and identify the congruence angle by calculating the energy levels at each of the receivers. The receiver with the maximum energy is the one that is pointed closest to the transmitter. If at least two receivers receive the signal, then an additional improvement in angle estimates can be obtained using Time of Arrival estimates or Time Difference of Arrival calculations. If the transmitter implements carefully modulated signals, then it is possible to estimate even more accurate angle estimates using a phase concordance methods (Reference 5).

The following embodiments are suggested: in one embodiment, the camera has one transmitter 850 and the audio endpoint 805 (having microphone 835) has three receivers 840. It is possible to estimate at the angle $\theta 2$ using well known Time Difference of Arrival calculations at the receivers on the audio endpoint. Typically, this will require the sensors to be placed 5 cm or greater from each other and distributed. In the diagram, three receivers are placed in a triangle around the centre of the device and are located a distance r 825 from the centre. Likewise, with appropriate timing information between the transmitter and receiver, the distance, D, can be trivially calculated. An addition of at least two transmitters at the camera endpoint, and appropriate modulation to avoid interference, it is possible to calculate angle, $\theta 1$ 820, thus providing full information of the geometry of the two devices with respect to each. In this embodiment the transmitters on the camera have a spatially wide beam to capture a large range of placements of the audio endpoint relative to the camera and the receivers are placed on the device in such a way to minimise shadowing. If the placement of the receivers are designed so as to shadow the beam from the transmitter and not all receivers provide useful information, then the accuracy of the estimated angle, $\theta 1$, will be reduced, but this angle can still be approximately calculated using received energy. The most robust calculations involve a combination of time of arrival, received energy, and phase information.

The situation can be inverted and the same information can be calculated using transmitters on the device and receivers on the camera. In this embodiment, there is a camera and an audio endpoint in the scene. The audio endpoint is both translated and rotated with respect to the plane of the field of view the camera and placed at distance D from the camera. The base of the camera has one or more ultrasonic emitters or detectors and the audio endpoint has one more ultrasonic emitters or detectors. With the appropriate number of emitters or detectors, the angles θ1, θ2, and distance D can be computed from this configuration of sensors.

Additionally, we extend the invention to cases where there are more than two devices capturing the scene. Presented here are a few more examples. In one case, we consider a single video and two audio devices. A plausible spatial scene is constructed simply from rendering the audio microphone signals appropriately to the left and right, however it is required to work out the associated angular spread and relative locations of the two audio sensors. In this example, each audio sensor is only mono, or a single channel so the orientation of the device is not critical, and we require the two angles or offset—one for each audio pickup. Given the nature of this scene and audio, the information for improving congruence may be the associated left and right shift from the center line of each of the microphones in the image. This is somewhat related to the angle, however is a product of the three dimensional relative positions. This is an interesting example, as it is noted that the location of the microphones in terms of left and right shift in the image plane is a relatively easy task and does not require solving the full pose problem.

At this point we see one aspect of the invention is that we may solve only the relevant aspects of relative geometry for improving congruence without the requirement for full spatial registration. The case of two mono audio devices in a scene. Here we may want to bring the audio captured by the two points of view into the single scene audio visual representation taking into account the microphones and their likelihood of imparting a bias into the audio scene due to object proximity. In this case, we see either the angles from the camera to the two microphones is of interest, and perhaps in the image plane it is sufficient to determine the relative shift or distance from the centre lie of the screen of each of the devices.

In one final example, we consider the case of two video devices being used to capture a scene and create a single presentation with some congruence. In this case one video camera is preferentially oriented to capture a white board, and the resulting video signal is to be a simple picture in picture insert. As people move in the room being captured, they will shift in the audio scene and also between the image frames. The relative orientation of the two video devices to the audio device can be used in an approximate sense to improve the congruence and continuity as the participants move to and from the whiteboard.

In this case there are two simultaneous video images visible from the one room used in the single congruent scene created for transmission, render or storage. Since there is only one sound capture point of view and a person at the whiteboard may also make noise, it is important to ensure that the orientation of the two image frames are arranged to keep the audio congruent. In order to achieve this, the relative orientation of the audio capture and two cameras is required. It is noted, for example, that in this case it could be the audio device that determines the relative orientation of both cameras since the devices are working co-operatively this allows the video to be better constructed. In this case, it is reasonable that both cameras are outside of each other's field of view, so therefore it requires solutions other than the video registration. In this final example we start to introduce the more general sense of different modalities, where the whiteboard itself may be considered more static information rather than video, or the insert could include content that was presented to a screen in the room being captured directly. In this case, there are benefits in the congruence of placement, sound relative positioning and the different visual media elements as transmitted, rendered or stored.

The idea of including confidence is important. Firstly because it drives home the point that accuracy is often not that important, and that the transformations to achieve better congruence are going to be often incomplete. An objective is to improve things and avoid extreme conflict or incongruence. Secondly the idea of confidence factors into how the system may behave. There are safer options in situations where there is potential though unknowable incongruence.

Figure 9:
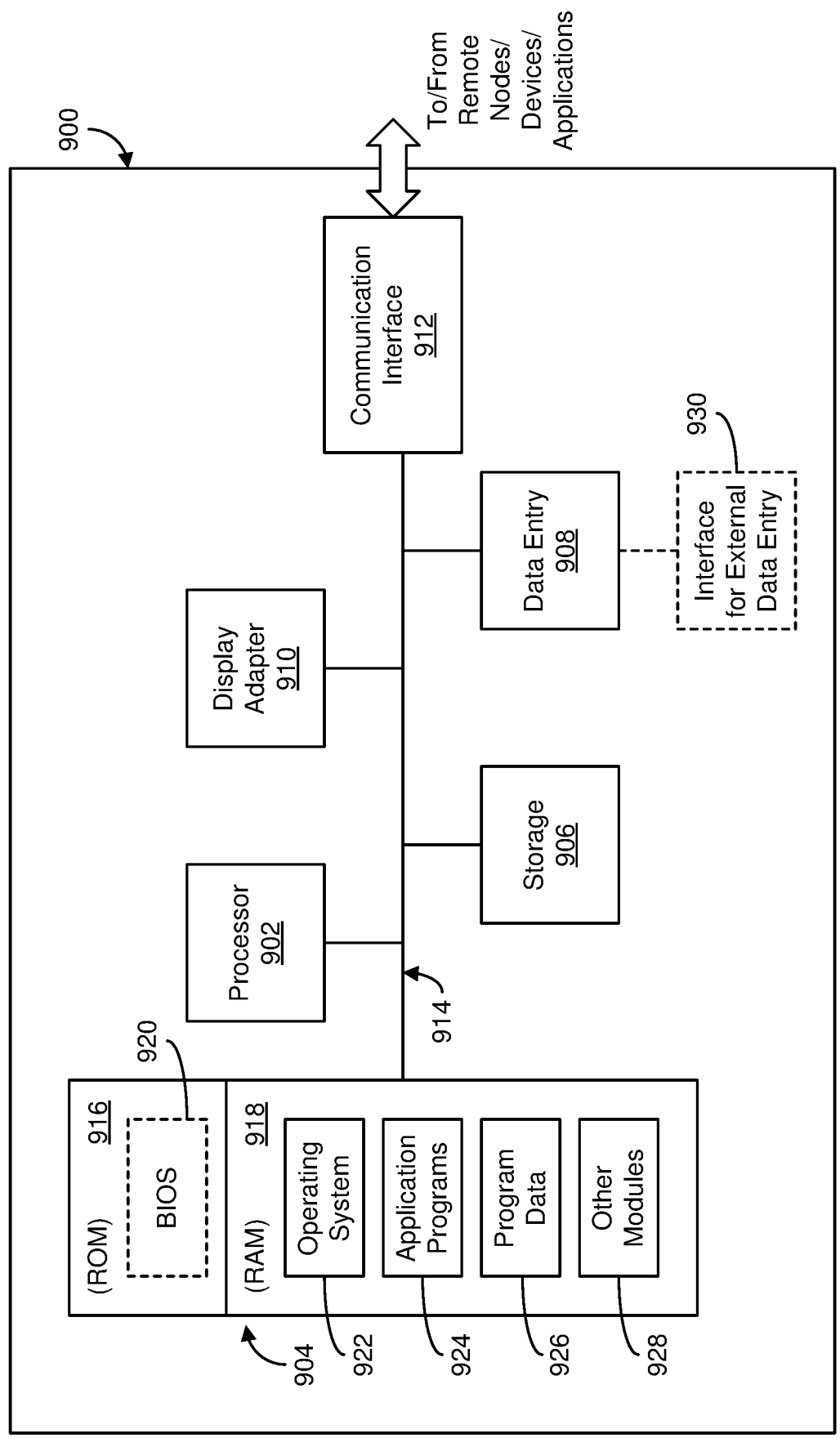
FIG. 9 is a block diagram of an exemplary system for modifying far-end signal playback on an audio device, in an embodiment.

FIG. 9 is a block diagram of an exemplary system for modifying far-end signal playback on an audio device, in various embodiments. With reference to FIG. 9, an example system for implementing the subject matter disclosed herein, including the methods described above, includes a hardware device 900, including a processing unit 902, memory 904, storage 906, data entry module 908, display adapter 910, communication interface 912, and a bus 914 that couples elements 904-912 to the processing unit 902.

The bus 914 may comprise any type of bus architecture. Examples include a memory bus, a peripheral bus, a local bus, etc. The processing unit 902 is an instruction execution machine, apparatus, or device and may comprise a microprocessor, a digital signal processor, a graphics processing unit, an application specific integrated circuit (ASIC), a field programmable gate array (FPGA), etc. The processing unit 902 may be configured to execute program instructions stored in memory 904 and/or storage 906 and/or received via data entry module 908.

The memory 904 may include read only memory (ROM) 916 and random access memory (RAM) 918. Memory 904 may be configured to store program instructions and data during operation of device 900. In various embodiments, memory 904 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 904 may also include nonvolatile memory technologies such as nonvolatile flash RAM (NVRAM) or ROM. In some embodiments, it is contemplated that memory 904 may include a combination of technologies such as the foregoing, as well as other technologies not specifically mentioned. When the subject matter is implemented in a computer system, a basic input/output system (BIOS) 920, containing the basic routines that help to transfer information between elements within the computer system, such as during start-up, is stored in ROM 916.

The storage 906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 900.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 906, ROM 916 or RAM 918, including an operating system 922, one or more applications programs 924, program data 926, and other program modules 928. A user may enter commands and information into the hardware device 900 through data entry module 908. Data entry module 908 may include mechanisms such as a keyboard, a touch screen, a pointing device, etc. Other external input devices (not shown) are connected to the hardware device 900 via external data entry interface 930. By way of example and not limitation, external input devices may include a microphone, joystick, game pad, satellite dish, scanner, or the like. In some embodiments, external input devices may include video or audio input devices such as a video camera, a still camera, etc. Data entry module 908 may be configured to receive input from one or more users of device 900 and to deliver such input to processing unit 902 and/or memory 904 via bus 914.

The hardware device 900 may operate in a networked environment using logical connections to one or more remote nodes (not shown) via communication interface 912. The remote node may be another computer, a server, a router, a peer device or other common network node, and typically includes many or all of the elements described above relative to the hardware device 900. The communication interface 912 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 912 may include logic configured to support direct memory access (DMA) transfers between memory 904 and other devices.

In a networked environment, program modules depicted relative to the hardware device 900, or portions thereof, may be stored in a remote storage device, such as, for example, on a server. It will be appreciated that other hardware and/or software to establish a communications link between the hardware device 900 and other devices may be used.

It should be understood that the arrangement of hardware device 900 illustrated in FIG. 9 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 900. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method of determining orientation of an audio device in a video conference, the method comprising:
   receiving, by the audio device, a sequence of audio signals having a bandwidth of at least 2 kHz from a plurality of speakers of a video conferencing system, each of the sequence being transmitted a predetermined time duration apart, every one of the plurality of speakers transmitting at least one of the audio signals in the sequence;
   determining, by the audio device, a respective impulse response of each of the sequence of audio signals, the impulse responses being based on recordings of the transmitted sequence;
   estimating, from the determined impulse responses, times of arrival for the audio signals at the audio device;
   calculating a distance from each of the plurality of speakers to the audio device based on the estimated times of arrival for the audio signals; and
   calculating an orientation angle between the video conferencing system and the audio device based on the calculated distances from each of the plurality of speakers to the audio device.

2. The method of claim 1, wherein the audio signals are chirped audio signals.

3. The method of claim 1, wherein the plurality of speakers include three speakers that are equidistant from each other.

4. The method of claim 1, wherein the times of arrival of each of the sequence of audio signals are estimated by convolving recordings of the transmitted sequence of audio signals with a respective filter for each transmitted audio signal, wherein at least one filter incorporates a calculated band-limited inverse of the transmitted audio signal.

5. The method of claim 1, the calculating the distance comprising obtaining, from each impulse response, an envelope response indicative of arrival of energy from each speaker, the envelope response being used to determine the time of arrival for each of the sequence of audio signals and the distances between the audio device and each of the plurality of speakers.

6. The method of claim 1, wherein the sequence of audio signals comprises acoustic signals only.

7. The method of claim 1, wherein the sequence of audio signals comprises ultrasonic signals only.

8. The method of claim 1, wherein the sequence of audio signals comprises a spread spectrum response that uses a long broad band coded sequence at a signal level less than ambient noise in a conference room.

9. A system comprising:
   one or more processors;
   a non-transitory computer-readable medium storing instructions operable to cause the one or more processors to perform operations of determining orientation of an audio device in a video conference, the operations comprising:
      receiving, by the audio device, a sequence of audio signals having a bandwidth of at least 2 kHz from a plurality of speakers of a video conferencing system, each of the sequence being transmitted a predetermined time duration apart, every one of the plurality of speakers transmitting at least one of the audio signals in the sequence;
      determining, by the audio device, a respective impulse response of each of the sequence of audio signals, the impulse responses being based on recordings of the transmitted sequence;
      estimating, from the determined impulse responses, times of arrival for the audio signals at the audio device;
      calculating a distance from each of the plurality of speakers to the audio device based on the estimated times of arrival for the audio signals; and
      calculating an orientation angle between the video conferencing system and the audio device based on the calculated distances from each of the plurality of speakers to the audio device.

10. The system of claim 9, wherein the plurality of speakers include three speakers that are equidistant from each other.

11. The system of claim 9, wherein the times of arrival of each of the sequence of audio signals are estimated by convolving recordings of the transmitted sequence of audio signals with a respective filter for each transmitted audio signal, wherein at least one filter incorporates a calculated band-limited inverse of the transmitted audio signal.

12. The system of claim 9, the calculating the distance comprising obtaining, from each impulse response, an envelope response indicative of arrival of energy from each speaker, the envelope response being used to determine the time of arrival for each of the sequence of audio signals and the distances between the audio device and each of the plurality of speakers.

13. The system of claim 9, wherein the sequence of audio signals comprises ultrasonic signals only.

14. The system of claim 9, wherein the sequence of audio signals comprises a spread spectrum response that uses a long broad band coded sequence at a signal level less than ambient noise in a conference room.

15. A non-transitory computer-readable medium storing instructions operable to cause one or more processors to perform operations of determining orientation of an audio device in a video conference, the operations comprising:
   receiving, by the audio device, a sequence of audio signals having a bandwidth of at least 2 kHz from a plurality of speakers of a video conferencing system, each of the sequence being transmitted a predetermined time duration apart, every one of the plurality of speakers transmitting at least one of the audio signals in the sequence;

determining, by the audio device, a respective impulse response of each of the sequence of audio signals, the impulse responses being based on recordings of the transmitted sequence;

estimating, from the determined impulse responses, times of arrival for the audio signals at the audio device;

calculating a distance from each of the plurality of speakers to the audio device based on the estimated times of arrival for the audio signals; and calculating an orientation angle between the video conferencing system and the audio device based on the calculated distances from each of the plurality of speakers to the audio device.

16. The non-transitory computer-readable medium of claim 15, wherein the audio signals are chirped audio signals.

17. The non-transitory computer-readable medium of claim 15, wherein the plurality of speakers include three speakers that are equidistant from each other.

18. The non-transitory computer-readable medium of claim 15, wherein the times of arrival of each of the sequence of audio signals are estimated by convolving recordings of the transmitted sequence of audio signals with a respective filter for each transmitted audio signal, wherein at least one filter incorporates a calculated band-limited inverse of the transmitted audio signal.

19. The non-transitory computer-readable medium of claim 15, the calculating the distance comprising obtaining, from each impulse response, an envelope response indicative of arrival of energy from each speaker, the envelope response being used to determine the time of arrival for each of the sequence of audio signals and the distances between the audio device and each of the plurality of speakers.

20. The non-transitory computer-readable medium of claim 15, wherein the sequence of audio signals comprises a spread spectrum response that uses a long broad band coded sequence at a signal level less than ambient noise in a conference room.

* * * * *